United States Patent Office 3,396,169
Patented Aug. 6, 1968

3,396,169
SUBSTITUTED 2-PHENYL-1-(TERTIARY-AMINOALKOXY)PHENYL - 3,4 - DIHYDRONAPHTHALENES
Daniel Lednicer, Kalamazoo, Mich., assignor to The Upjohn Company, Kalamazoo, Mich., a corporation of Delaware
No Drawing. Continuation-in-part of application Ser. No. 135,767, Sept. 5, 1961. This application Oct. 26, 1966, Ser. No. 589,511
The portion of the term of the patent subsequent to Jan. 5, 1982, has been disclaimed
14 Claims. (Cl. 260—294.7)

ABSTRACT OF THE DISCLOSURE

This invention is a group of compounds consisting of (a) the free bases, (b) the pharmacologically acceptable acid addition salts, (c) the N-oxides, (d) the N-oxide pharmacologically acceptable acid addition salts, and (e) the quaternary ammonium salts of compounds having the formula:

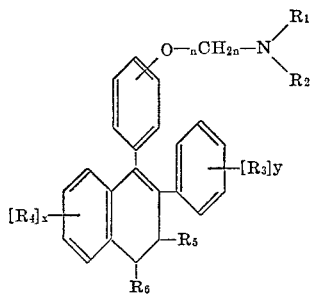

wherein $R_1$ and $R_2$ are selected from the class consisting of lower-alkyl and lower-alkyl linked together to form a 5 to 7 ring atom saturated heterocyclic radical, one of the ring atoms of which, in addition to the amino nitrogen atom, is selected from the class consisting of carbon, nitrogen, and oxygen, the other ring atoms being carbon, $R_3$ and $R_4$ are selected from the class consisting of trifluoromethyl, lower-alkyl, lower-alkenyl, hydroxy, lower-alkenyloxy, aryloxy from 6 to 12 carbon atoms, inclusive, halogen, lower-alkylmercapto, and arylmercapto from 6 to 12 carbon atoms, inclusive, $C_nH_{2n}$ represents an alkylene group from 2 to 6 carbon atoms, inclusive, $x$ and $y$ are integers from 0 to 4, inclusive, and $R_5$ and $R_6$ are selected from the class consisting of hydrogen and lower-alkyl. These compounds are useful as anti-inflammatory agents, antifertility agents, estrogenic agents, antiestrogenic agents, gonadotrophin regulators, agents for the lowering of cholesterol blood levels, and central nervous system stimulants in the treatment of birds and mammals, including man and animals of economic value. For these purposes, these compounds exhibit an improved therapeutic ratio compared with known agents. The novel compounds of this invention are also useful as antibacterial, antifungal, and agents.

This application is a continuation-in-part of application Ser. No. 135,767, filed Sept. 5, 1961, now abandoned.

This invention relates to novel 3,4-dihydronaphthalenes and is more particularly concerned with novel substituted 2 - phenyl-1-(tertiaryaminoalkoxy)phenyl - 3,4 - dihydronaphthalenes and acid addition salts, quaternary ammonium salts, N-oxides and N-oxide acid addition salts thereof, and with processes for their preparation.

The novel compounds of the invention are selected from the class consisting of (a) the free bases, (b) the pharmacologically acceptable acid addition salts, (c) the N-oxides, (d) the N-oxide pharmacologically acceptable acid addition salts, and (e) the quaternary ammonium salts of compounds having the formula:

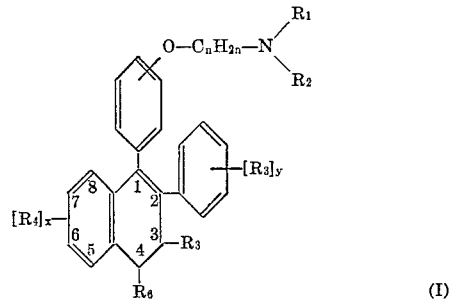

wherein $R_1$ and $R_2$ are selected from the class consisting of lower-alkyl and lower-alkyl linked together to form a 5 to 7 ring atom saturated heterocyclic radical, one of the ring atoms of which, in addition to the amino nitrogen atom, is selected from the class consisting of carbon, nitrogen, and oxygen, the other ring atoms being carbon, $R_3$ and $R_4$ are selected from the class consisting of trifluoromethyl, lower-alkyl, lower-alkenyl, hydroxy, lower-alkenyloxy, aryloxy from 6 to 12 carbon atoms, inclusive, halogen, lower-alkylmercapto, and arylmercapto from 6 to 12 carbon atoms, inclusive, $C_nH_{2n}$ represents an alkylene group from 2 to 6 carbon atoms, inclusive, $x$ and $y$ are integers from 0 to 4, inclusive, and $R_5$ and $R_6$ are selected from the class consisting of hydrogen and lower-alkyl. An especially preferred class of compounds for the uses set forth hereinafter are those Formula I compounds wherein $x$ and $y$ are zero, and $R_5=R_6=H$.

The term "lower-alkyl" means an alkyl group containing from 1 to 8 carbon atoms, inclusive, such as methyl, ethyl, propyl, butyl, amyl, hexyl, heptyl, octyl, and isomeric forms thereof. The term "lower-alkenyl" means an alkenyl group containing from 2 to 8 carbon atoms, inclusive, such as vinyl, allyl, butenyl, pentenyl, hexenyl, heptenyl, octenyl, and isomeric forms thereof. The term "lower-alkenyloxy" means an alkenyloxy group containing from 2 to 8 carbon atoms, inclusive, such as vinyloxy, allyloxy, butenyloxy, pentenyloxy, hexenyloxy, heptenyloxy, octenyloxy, and isomeric forms thereof. The term "aryloxy from 6 to 12 carbon atoms, inclusive" includes phenoxy, tolyloxy, xylyloxy, naphthyloxy, biphenylyloxy, and the like. The term "halogen" is inclusive of fluorine, chlorine, bromine, and iodine. The term "lower-alkylmercapto" means an alkylmercapto group containing from 1 to 8 carbon atoms, inclusive, such as methylmercapto, ethylmercapto, propylmercapto, butylmercapto, amylmercapto, hexylmercapto, heptylmercapto, octylmercapto, and isomeric forms thereof. The term "arylmercapto from 6 to 12 carbon atoms, inclusive" includes phenylmercapto, tolylmercapto, xylylmercapto, naphthylmercapto, biphenylylmercapto, and the like. The term "alkylene group from 2 to 6 carbon atoms, inclusive" includes ethylene, propylene, butylene, amylene, hexylene, and isomeric forms thereof.

The term "lower alkyl groups linked together to form a 5 to 7 ring atom saturated heterocyclic radical, one of the ring atoms of which, in addition to the amino nitrogen atom, is selected from the class consisting of carbon, nitrogen, and oxygen, the other ring atoms being carbon" is inclusive of pyrrolidino, 2-methylpyrrolidino, 2,2-dimethylpyrrolidino, and like alkylpyrrolidino groups, piperazino, 4-methylpiperazino, 2,4-dimethylpiperazino, and like alkylpiperazino groups, morpholino, piperidino, 2-methylpiperidino, 3-methylpiperidino, and like alkylpiperidino groups, hexamethyleneimino, homopiperazino, homomorpholino, and the like.

The acid addition salts of the invention comprise the salts of the compounds having the Formula I and of the corresponding N-oxides with pharmocologically acceptable acids such as sulfuric, hydrochloric, nitric phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids, and the like.

The quaternary ammonium salts of the invention are the salts obtained by reacting the free bases having the Formula I with quaternating agents for example, lower alkyl halides, lower-alkenyl halides, di(lower-alkyl) sulfates, aralkyl halides, lower-alkyl arylsulfonates, and the like. The term "lower-alkyl" has the meaning hereinbefore defined. The term "aralkyl" means an aralkyl group containing from 7 to 13 carbon atoms, inclusive, such as benzyl, phenethyl, phenylpropyl, benzhydryl, and the like. Examples of quaternary salts of the compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, and the like.

The novel compounds of the invention, including the free bases of Formula I, the acid addition salts thereof, the quaternary ammonium salts thereof, and the corresponding N-oxides and N-oxide acid addition salts possess pharmacological activity. Illustratively, the compounds of the invention are useful as anti-inflammatory agents, antifertility agents, estrogenic agents, antiestrogenic agents, gonadotrophin regulators, agents for the lowering of cholesterol blood levels, and central nervous system stimulants in the treatment of birds and mammals, including man and animals of economic value. For these purposes, these compounds exhibit an improved therapeutic ratio compared with known agents. The novel compounds of this invention are also useful as antibacterial, antifungal and agents.

Because of their antifertility activity, the novel compounds of this invention are valuable for animal pest control. For example, the compounds of the invention are formulated in combination with baits and/or attractants and placed in feeding stations accessible to undesirable rodents and other small animals including Canidae such as coyotes, foxes, wolves, jackals, and wild dogs and birds such as starlings, gulls, redwing blackbirds, pigeons, and the like, thus reducing hazards to aviation by their presence on runways and in the vicinity of airfields, the spread of disease, and destruction to property in both rural and urban areas.

For purposes of administration to birds and to mammals, including man and animals of economic value such as horses, cattle, sheep, pigs, mice, rats, rabbits, and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

As an example, 1-[p-(2-piperidinoethoxy)phenyl]-2-phenyl-6-hydroxy-3,4-dihydronaphthalene hydrochloride, i.e., the Formula I compound wherein $x$ is one, $y$ is zero, $n$ is 2, $R_4$ is hydroxy at the 6 position, $R_5$ and $R_6$ are both hydrogen, and $R_1$ and $R_2$ together with the attached nitrogen represents piperidino, inhibits the growth of fungi such as *Microsporum canis, Trichophyton rubrum, Alternaria solani,* and *Fusarium oxysporum* var. *cubense,* and can be used, for example, in the treatment of topical fungal infections in mammals and other animals or in the treatment of plant infections caused by such fungi, or in the eradication or prevention of growth of such fungi on inanimate objects. Also illustratively, the same specific compound inhibits the growth of bacteria such as *Streptococcus lactis, Streptococcus fecalis, Staphylococcus aureus, Staphylococcus albus,* and *Bacillus subtilis,* and can be used, for example, to inhibit the growth of such organisms on inanimate objects, for example, utensils used in the preparation and serving of foods, and in medical and dental treatment areas and objects.

As a further example, 1-[p-(2-pyrrolidinoethoxy)phenyl]-2-phenyl-3,4-dihydronaphthalene hydrochloride, i.e., the Formula I compound wherein $x$ and $y$ are both zero, $n$ is 2, $R_1$ and $R_2$ together with the attached nitrogen represents pyrrolidino, and $R_5$ and $R_6$ are both hydrogen, stimulates mammalian respiratory and circulatory systems, and is useful in the treatment of mammals including valuable domestic animals and pets, for example, dogs, cats, and horses, for barbiturate posioning, dangerously deep anesthesia, depressive lethargic conditions, as a geriatric stimulant, and as a stimulant, for example, for inactive spayed female dogs and cats. For those purposes, a suitable dosage range is about 5 to about 50 mg. per kg. per day, preferably in divided doses depending upon the age, weight, route of administration, frequency of use, and condition of the animal. Preferred administration is oral or intramuscular. A single oral dose is advantageously 25 mg. to 15 g. depending on the size of the size of the animal being treated.

The novel Formula I compounds of this invention are also useful for other purposes. For example, the free base form is useful as an intermediate in the preparation of N-oxides and quaternary ammonium salts. The acid addition salts are useful for upgrading the free base form.

The novel free bases of Formula I also form salts with fluosilicic acid which are useful as mothproofing agents according to U.S. Patents 1,915,334 and 2,075,359, and salts with thiocyanic acid which condense with formaldehyde to form resinous materials useful as pickling inhibitors according to U.S. Patents 2,425,320 and 2,606,155.

The novel Formula I free bases also form salts with penicillins. Those salts have solubility characteristics which cause them to be useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a compound of Formula I, for example, the chloride ion of a hydrochloride, with the anionic form of a penicillin.

The novel free bases of Formula I are also useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds, except wherein $R_3$ and/or $R_4$ are hydroxy.

The novel compounds of the invention having the Formula I can be prepared by reaction of an appropriately substituted 1 - keto - 1,2,3,4 - tetrahydronaphthalene (i.e., an α-tetralone) having the formula:

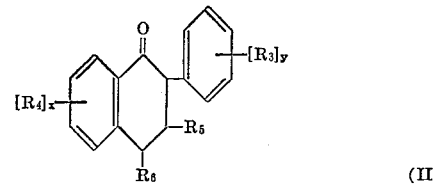

(II)

wherein $R_3$, $R_4$, $R_5$, $R_6$, $x$ and $y$ have the significance hereinbefore defined (with the exception noted below), with a Grignard reagent having the formula:

$$\begin{array}{c}R_1\\ \phantom{R}\diagdown\\ \phantom{RR}N-C_nH_{2n}-O-\!\!\!\left\langle\;\;\right\rangle\!\!\!-MgHal\\ \phantom{RR}\diagup\\ R_2\end{array}$$

(III)

wherein $R_1$, $R_2$, and $C_nH_{2n}$ have the significance hereinbefore defined and Hal represents a halogen atom. The reaction is carried out advantageously in the presence of an inert solvent under anhydrous conditions in accordance with the established procedure for Grignard reactions. Suitable inert solvents include diisopropyl ether, diisobutyl ether, tetrahydrofuran, and the like. The reaction can be carried out at temperatures within the range of about 0° C. to about the boiling point of the solvent employed and is preferably carried out at elevated temperatures, for example, at or near the boiling point of the reaction mixture.

The reaction time varies within wide limits according to the temperature at which the reaction is conducted. Generally speaking, where the reaction is carried out at elevated temperatures such as the boiling point of the reaction mixture, it is necessary to employ a reaction time of the order of several hours to ensure completion of the reaction.

The desired dihydronaphthalene having the Formula I can be isolated from the reaction mixture by conventional procedures, for example, by decomposing the reaction mixture with water, ammonium chloride, and the like, followed by separation of the organic layer and removal of solvent therefrom. In many cases, the product so obtained is largely the desired compound (I) contaminated with minor impurities and unchanged starting material which can be removed by simple procedures, for example by isolation of the desired compound (I) as an acid addition salt.

However, in some cases the desired 3,4-dihydronaphthalene (I) is contaminated with appreciable quantities of the corresponding 1 - hydroxy - 1,2,3,4-tetrahydronaphthalene having the Formula IV below and in certain cases the reaction product obtained is largely this compound containing only a small amount of the desired compound (I).

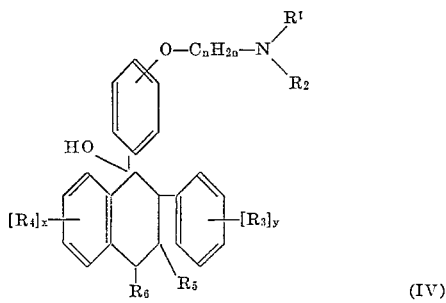

(IV)

In the above formula $R_1$, $R_2$, $R_3$, $R_4$, $R_5$ $R_6$, $C_nH_{2n}$ and $x$ and $y$ have the significance hereinbefore defined.

The compound (IV), when obtained as the major reaction product or when present in significant quantities in the above-described reaction product, can be converted to the desired compound (I) by dehydration. The dehydration can be effected in most instances by heating the compound (IV) in a solvent such as benzene, toluene, xylene, and the like which forms an azeotrope with water, in the presence of a trace of a strong acid such as hydrochloric, sulfuric, p-toluenesulfonic acids and the like. The water which is formed in the dehydration is removed from the reaction mixture azeotropically. There is thereby obtained a solution of the desired compound (I) from which the latter can be isolated by evaporation or other conventional procedures.

In certain cases, the dehydration of the 1-hydroxy-1,2,3,4-tetrahydronaphthalene (IV) requires more drastic conditions such as heating the compound at, or slightly above, its melting point, preferably in the presence of an inert gas, until evolution of water is complete.

When either or both of the groups $R_3$ and $R_4$ in the starting α-tetralone (II) represents free hydroxy, it is necessary, before carrying out the Grignard reaction described above, to protect this group with a radical which can be removed subsequently to yield the desired compound (I) with a free hydroxy group or groups. A particularly convenient manner in which a free hydroxy group or groups in the starting α-tetralone can be so protected is by conversion to the corresponding tetrahydropyranyl ether. The latter conversion can be accomplished readily by treating the α-tetralone (II) containing a free hydroxy group or groups with 2,3-dihydropyran in the presence of a trace of p-toluenesulfonic acid or a mineral acid such as hydrochloric acid. After the α-tetralone (II) with hydroxy group or groups protected in this manner has been converted to the corresponding compound (I) by the reaction described above, the tetrahydropyranyl ether can be hydrolyzed, for example, using aqueous mineral acid to liberate the free hydroxy group.

The Grignard reagents having the Formula III which are employed as starting materials in the process of the invention can be prepared by reaction of magnesium in an anhydrous inert organic solvent such as diisopropyl ether, dibutyl ether, tetrahydrofuran, and the like with the appropriately substituted halobenzene having the formula:

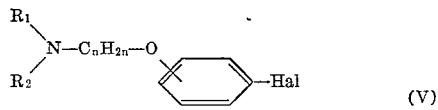

(V)

wherein $R_1$, $R_2$, $C_nH_{2n}$ and Hal have the significance hereinbefore defined, using procedures well-known in the art for the preparation of Grignard reagents.

The halobenzenes having the Formula V can be prepared as set forth in U.S. Patent No. 3,274,213 by etherification of the corresponding halophenol with the appropriate tertiaryaminoalkyl halide

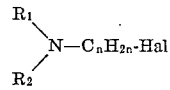

wherein $R_1$, $R_2$, and $C_nH_{2n}$, and Hal have the significance hereinbefore defined. The etherification is conducted advantageously in an inert solvent such as a lower alkanol, for example, methanol, ethanol, isopropyl alcohol, and the like in the presence of a base such as sodium hydroxide, sodium methoxide, and the like.

The tertiaryaminoalkyl halides having the formula

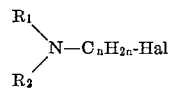

wherein $R_1$, $R_2$, $C_nH_{2n}$ and Hal have the significance hereinbefore defined, employed in the preparation of the halobenzenes (V) can themselves be prepared by halogenation of the corresponding tertiaryaminoalkanols, which tertiaryaminoalkanols in turn can be made by inter action of the requisite second amine

wherein $R_1$ and $R_2$ have the significance hereinbefore defined, with the appropriate haloalkanol, Hal-$C_nH_{2n}$OH, wherein Hal and $C_nH_{2n}$ have the significance hereinbefore defined, in accordance with known methods. The condensation between the secondary amine

and the haloalkanol Hal-$C_nH_{2n}$OH can be carried out, for example, using the procedure described by Moffett, J. Org. Chem. 14, 862, 1949. Alternatively, the desired tertiaryaminoalkanols can be prepared by heating the secondary amine

with the appropriate haloalkanoic acid ester, followed by reduction of the thus-produced aminoalkanoic acid ester with lithium aluminum hydride according to the method described by Moffett, supra.

The conversion of the tertiaryaminoalkanols so obtained to the corresponding tertiaryaminoalkyl halides can be carried out by the use of known halogenating agents such as thionyl bromide, thionyl chloride, phosphorus tribromide, phosphorus trichloride, and the like, using, for example, the procedure described by Moffett et al., J. Am. Chem. Soc. 77, 1565, 1955.

The α-tetralone (II) starting material wherein $x$ and $y$ are zero, i.e., 2-phenyl-1,2,3,4-tetrahydro-1-naphthalenone is known in the art. The other α-tetralone starting materials within the scope of Formula II except those wherein $R_3$ or $R_4$ represent hydroxy or alkenyloxy, and those wherein $R_6$ represents alkyl can be prepared according to the following reaction scheme:

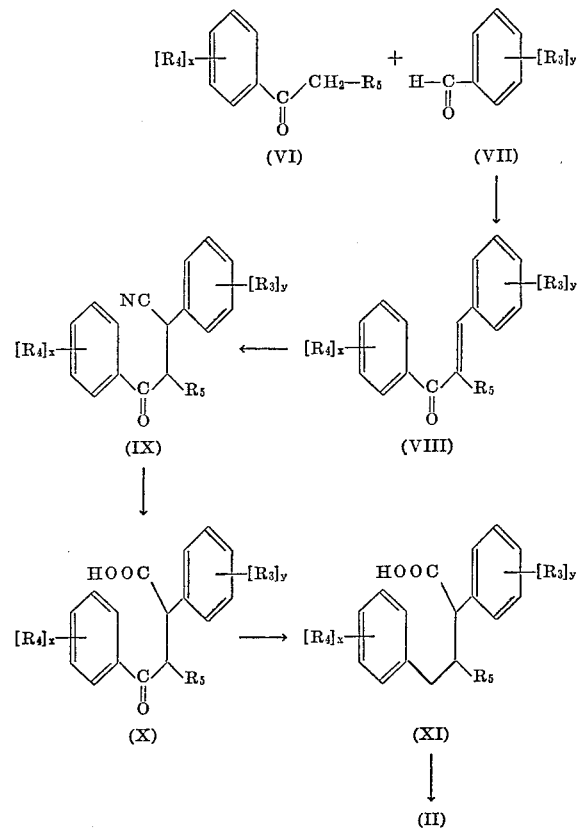

In the above reaction sequence, $R_3$, $R_4$, $R_5$, and $x$ and $y$ have the significance hereinbefore described with the exceptions noted above.

In the above reaction sequence, the appropriately substituted alkyl phenyl ketone (VI) is condensed with the appropriately substituted benzaldehyde (VII) to produce the corresponding chalcone (VIII) under conditions conventionally employed in the preparation of chalcones, for example, by condensation of (VI) and (VII) in the presence of a base such as sodium hydroxide, potassium hydroxide, and the like, in an inert solvent such as a mixture of water and a lower alkanol, for example, methanol, ethanol, and the like. The reaction is generally conducted at or below room temperature with external cooling as required. The chalcone (VIII) is isolated from the reaction mixture and purified by conventional procedures, for example, by solvent extraction followed by distillation, in the case of a liquid product, or recrystallization in the case of a solid product.

The chalcone (VIII) so obtained is then converted to the corresponding nitrile (IX) by reaction with hydrogen cyanide, for example, by treatment with an alkali metal cyanide such as potassium cyanide, sodium cyanide, and the like in the presence of acetic acid and an inert solvent such as aqueous methanol, aqueous ethanol and the like, using the procedure described by Newman, J. Am. Chem. Soc. 60, 2947, 1938 for the conversion of benzalacetophenone (chalcone) to α-phenyl-β-benzoylpropionitrile. The desired nitrile (IX) generally separates from the reaction mixture as a solid and can be isolated by filtration and purified by recrystallization.

The nitrile (IX) so obtained is hydrolyzed to the corresponding keto acid (X) by conventional procedures for the hydrolysis of nitriles, for example, by heating under reflux in the presence of aqueous mineral acid such as sulfuric acid until hydrolysis is substantially complete. The desired acid (X) generally separates from the reaction mixture as a solid and is isolated by filtration and purified by recrystallization or by other conventional procedures, for example, by conversion to an alkali metal salt followed by acidification of the latter to regenerate the free acid.

The keto acid (X) so obtained is then subjected to reduction to form the corresponding acid (XI). The reduction can be effected using any of the methods customarily employed for the conversion of a keto group to a methylene group. A particularly suitable reducing agent is amalgamated zinc and treatment of the keto acid (X) with amalgamated zinc in the presence of a mineral acid affords the desired acid (XI) in excellent yield. The acid (XI) can be isolated from the reaction mixture by conventional procedures, for example, by decantation of the liquid reaction mixture, followed by solvent extraction of the decanted liquid and evaporation of the solvent. Generally speaking, the acid (XI) so obtained is sufficiently pure to be used in the next step of the synthesis without further treatment. If desired, however, the acid (XI) so obtained can be purified by conventional procedures, for example, by distillation in the case of a liquid or recrystallization in the case of a solid or by conversion to an alkali metal salt followed by acidification of the latter to yield the free acid.

In the final stage of the synthesis the acid (XI) is cyclized to the required α-tetralone (II) in the presence of a Lewis acid, using the general procedure described by Fieser and Hershberg, J. Am. Chem. Soc. 61, 1272, 1939. The term "Lewis acid" is well known in the art and is defined succinctly by Fieser and Fieser, "Organic Chemistry," third edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the acid (XI) according to the above procedures comprises adding the acid (XI) to liquid hydrogen fluoride with stirring and then allowing the hydrogen fluoride to evaporate at about 20–30° C. The desired α-tetralone (II) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The α-tetralone (II) so obtained can be purified, if desired, by conventional procedures, for example, by recrystallization.

Alternatively, the acid (XI) can be cyclized to the α-tetralone (II) by conversion of the acid (XI) to the corresponding acid chloride and treatment of the latter with aluminum chloride or stannic chloride according to the procedure described by Fieser et al., J. Am. Chem. Soc. 60, 170, 1938.

The α-tetralones (II) wherein $R_3$ or $R_4$ represents hydroxy can be prepared conveniently by dealkylation of the corresponding compounds of Formula II wherein $R_3$ or $R_4$ represents alkoxy. The dealkylation can be effected using conventional methods, for example, by heating with aluminum chloride or bromide in the presence of an inert solvent such as benzene, xylene, and the like.

The α-tetralones of Formula II wherein $R_3$ or $R_4$ represents alkenyloxy can be prepared conveniently by alkenylation of the corresponding compounds wherein $R_3$ or $R_4$ represents hydroxy. The alkenylation can be effected using conventional procedures, for example, by reacting the free hydroxy compound with the appropriate alkenyl halide in the presence of a base such as potassium carbonate, sodium methoxide, and the like.

The α-tetralones of Formula II wherein $R_6$ represents alkyl can be prepared by a modification of the synthesis described above. Thus the keto acid (X) is alkylated with an appropriate alkylating agent, for example, the appropriate alkylmagnesium halide $R_6MgHal$ wherein $R_6$ is a lower-alkyl radical and Hal represents a halogen, preferably bromine or chlorine, to produce the corresponding carbinol having the formula:

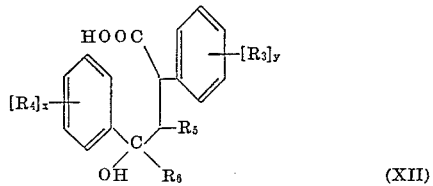

(XII)

wherein $R_3$, $R_4$, $R_5$, $x$ and $y$ have the significance hereinbefore defined, and $R_6$ represents alkyl.

The reaction of the keto acid (X) with the alkylmagnesium halide is carried out under conditions normally employed in Grignard reactions, preferably employing an excess of the Grignard reagent. The reaction mixture is decomposed by conventional procedures, for example, by treatment with water, ammonium chloride, dilute acid or the like. The desired product (XII) is isolated by solvent extraction or other conventional procedures and purified by recrystallization in the case of a solid or distillation in the case of a liquid.

Alternatively, the alkylation of the keto acid (X) to the carbinol (XII) is effected by treatment of (X) with the appropriate alkyl lithium compound in the presence of an inert solvent such as ether, benzene, toluene, and the like. The lithium compound is advantageously employed in excess of the stoichiometric proportion and is preferably employed in an amount of at least 1.5 moles per mole of compound (X). The reaction is advantageously conducted at elevated temperatures, suitably at the boiling point of the solvent employed. The desired compound (XII) can be isolated from the reaction mixture, for example, by decomposing the latter with water followed by solvent extraction and removal of solvent. The compound (XII) so obtained can be purified as described above.

The carbinol (XII) so obtained is then dehydrated by treatment with a dehydrating agent such as zinc chloride, or in many cases by heat alone, to form the corresponding olefinic acid having the formula:

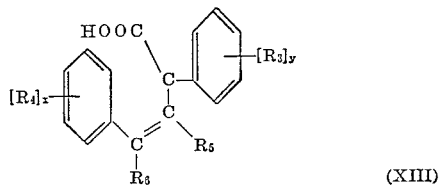

(XIII)

followed by catalytic hydrogenation of the latter compound in the presence of a hydrogenation catalyst such as platinum oxide, palladium-on-charcoal and the like, to yield the desired saturated acid having the formula:

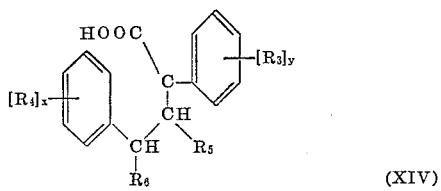

(XIV)

wherein $R_3$, $R_4$, $R_5$, $x$ and $y$ in Formulas XIII and XIV have the significance hereinbefore defined, and $R_6$ represents alkyl.

The saturated acid (XIV) is then cyclized to the corresponding α-tetralone (II) using the procedure described above for the cyclization of the acid (XI).

The alkyl phenyl ketones (VI) which are employed as starting materials in the above-described synthesis of the α-tetralones (II) can be prepared from the corresponding nuclear-substituted benzoic acids by conversion of the latter to the acid chlorides followed by reaction of the latter with the appropriate dialkyl cadmium according to the procedure described in Chemical Reviews 40, 15, 1947. Many of the alkyl phenyl ketones (VI) are known in the literature.

The aldehydes (VII) which are employed as starting materials in the above-described synthesis of the α-tetralones (II) can be obtained by reduction of the corresponding substituted benzoyl chlorides using lithium tri-t-butoxyaluminum hydride using the procedure described by Brown et al., J. Am. Chem. Soc. 80, 5377, 1958. Many of the benzaldehydes of the Formula VII are known in the literature.

An alternative method for the preparation of the α-tetralones of Formula II wherein $R_6$ represents hydrogen is that described by Newman, J. Am. Chem. Soc. 62, 2295, 1940, for the preparation of 2-o-tolyl-3-methyl-α-tetralone. The method comprises reacting the appropriately substituted benzyl cyanide

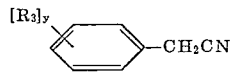

with the appropriately substituted phenethyl bromide

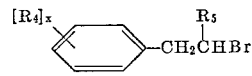

($R_3$, $R_4$, $R_5$, $x$ and $y$ having the significance hereinbefore defined) in the presence of sodamine and hydrolyzing the resulting nitrile to give the corresponding acid (XI) which is then cyclized as hereinbefore described to the α-tetralone (II).

The acid addition salts of the compounds of the invention having the Formula I can be prepared by methods well known in the art. For example, the acid addition salts of the invention can be prepared by reacting a free base having the Formula I with a pharmacologically acceptable acid, as hereinbefore defined, in the presence of an inert solvent such as methanol, ethanol, and the like.

The N-oxide compounds of the invention can be prepared by methods well konwn in the art, for example, by reacting the free base of the Formula I with an oxidizing agent such as hydrogen peroxide, peracetic acid, Caro's acid, and the like. Advantageously, the reaction is carried out at ordinary temperatures (e.g., of the order of 20 to 30° C.) in the presence of an inert solvent such as benzene, chloroform, lower-alkyly alkanoates such as ethyl acetate, and lower alkanols such as methanol, ethanol, isopropyl alcohol, and the like. Suitably the oxidizing agent is employed in at least stoichiometric proportion with respect to the free base (I) and preferably the oxidizing agent is present in a slight excess. When the reaction has been completed, any excess of oxidizing agent can be removed by treating the reaction mixture with an agent such as platinum oxide, palladium, Raney nickel, and inorganic hydrosulfites, such as sodium hydrosulfite, and the like.

The N-oxide acid addition salts of the invention can be prepared from the corresponding N-oxide and a pharmacologically acceptable acid using the procedures hereinbefore described for the preparation of the acid addition salts of the compounds (I).

The quaternary ammonium salts of the invention can be prepared by reacting a free base of the Formula I with a quaternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzhydryl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The following preparations and examples are illustrative of the process and products of the present invention, but are not to be construed as limiting.

PREPARATION 1

*Chalcones*

Following the procedure set forth in U.S. Patent No. 3,274,213 for the preparation of 3' - methoxychalcone, but replacing m - methoxyacetophenone by the following known compounds: 4' - amylacetophenone, 3' - bromoacetophenone, 4' - chloroacetophenone, 4' - chloro - 3'-ethylacetophenone, 4' - ethylacetophenone, 2' - fluoroacetophenone, 4' - methylmercaptoacetophenone, 4'-phenylmercaptoacetophenone, 4' - phenoxyacetophenone, 3' - trifluoromethylacetohpenone, propiophenone, butyrophenone, and valerophenone, there are obtained 4'-amylchalcone, 3' - bromochalcone, 4' - chlorochalcone, 4' - chloro - 3' - ethylchalcone, 4' - ethylchalcone, 2'-fluorochalcone, 4' - methylmercaptochalcone, 4' - phenylmercaptochalcone, 4' - phenoxychalcone, 3' - trifluoromethylchalcone, α - methylchalcone, α - ethylchalcone, and α - propylchalcone, respectively.

Similarly, using the procedure described in said U.S. Patent No. 3,274,213, but replacing benzaldehyde by the following known compounds: 2 - bromobenzaldehyde, 3 - chlorobenzaldehyde, 2 - chloro - 6 - fluorobenzaldehyde, 2,3 - dichlorobenzaldehyde, p - tolualdehyde, 2,6 - dimethylbenzaldehyde, 4 - methylmercaptobenzaldehyde, 4 - phenylmercaptobenzaldehyde, 4-phenoxybenzaldehyde, 4 - allylbenzaldehyde, and 4-trifluoromethylbenzaldehyde, there are obtained 2-bromochalcone, 3 - chlorochalcone, 2 - chloro - 6-fluorochalcone, 2,3 - dichlorochalcone, 4 - methylchalcone, 2,6 - dimethylchalcone, 4 - methylmercaptochalcone, 4 - phenylmercaptochalcone, 4 - phenoxychalcone, 4 - allylchalcone, and 4 - trifluoromethylchalcone, respectively.

PREPARATION 2

*2,4-diphenyl-4-ketobutyronitriles*

Following the procedure set forth in U.S. Patent No. 3,274,213 for the preparation of 2-phenyl-4-(3-methoxyphenyl)-4-ketobutyronitrile, but replacing 3'-methoxychalcone by 4'-amylchalcone, 3'-bromochalcone, 4'-chlorochalcone, 4'-chloro-3'-ethylchalcone, 4'-ethylchalcone, 2'-fluorochalcone, 4'-methylmercaptochalcone, 4'-phenylmercaptochalcone, 4' - phenoxychalcone, 3'-trifluoromethylchalcone, α-methylchalcone, α-ethylchalcone, α-propylchalcone, 2-bromochalcone, 3-chlorochalcone, 2 - chloro - 6 - fluorochalcone, 2,3-dichlorochalcone, 4-methylchalcone, 2,6-dimethylchalcone, 4-methylmercaptochalcone, 4-phenylmercaptochalcone, 4-phenoxychalcone, 4-allylchalcone, and 4-trifluoromethylchalcone, there are obtained 2-phenyl-4-(4-amylphenyl)-4-ketobutyronitrile, 2-phenyl-4-(3-bromophenyl)-4-ketobutyronitrile, 2 - phenyl-4-(4-chlorophenyl)-4-ketobutyronitrile, 2 - phenyl-4-(4-chloro-3-ethylphenyl)-4-ketobutyronitrile, 2-phenyl-4-(4-ethylphenyl)-4-ketobutyronitrile, 2-phenyl-4-(2-fluorophenyl) - 4 - ketobutyronitrile, 2-phenyl-4-(4 methylmercaptophenyl)-4-ketobutyronitrile, 2-phenyl-4-(4-phenylmercaptophenyl)-4-ketobutyronitrile, 2-phenyl-4-(4-phenoxyphenyl)-4-ketobutyronitrile, 2-phenyl-4-(3-trifluoromethylphenyl)-4-ketobutyronitrile, 2,4-diphenyl-3-methyl-4-ketobutyronitrile, 2,4-diphenyl-3-ethyl-4-keto-butyronitrile, 2,4-diphenyl-3-propyl-4-ketobutyronitrile, 2-(2 - bromophenyl)-4-phenyl-4-ketobutyronitrile, 2-(3-chlorophenyl)-4-phenyl-4-ketobutyronitrile, 2-(2-chloro-6 - fluorophenyl)-4-phenyl-4-ketobutyronitrile, 2-(2,3-dichlorophenyl)-4-phenyl-4-ketobutyronitrile, 2-p-tolyl-4-phenyl - 4 - ketobutyronitrile, 2-(2,6-dimethylphenyl)-4-phenyl-4-ketobutyronitrile, 2-(4-methylmercaptophenyl)-4-phenyl - 4 - ketobutyronitrile, 2-(4-phenylmercaptophenyl) - 4 - phenyl-4-ketobutyronitrile, 2-(4-phenoxyphenyl)-4-phenyl-4-ketobutyronitrile, 2-(4-allylphenyl)-4-phenyl-4-ketobutyronitrile, and 2-(4-trifluoromethylphenyl)-4-phenyl-4-ketobutyronitrile, respectively.

PREPARATION 3

*2,4-diphenyl-4-ketobutyric acids*

Following the procedure set forth in U.S. Patent No. 3,274,213 for the preparation of 2-phenyl-4-(3-methoxyphenyl)-4-ketobutyric acid, but replacing 2-phenyl-4-(3-methoxyphenyl)-4-ketobutyronitrile by the appropriately substituted 2,4-diphenyl-4-ketobutyronitrile (prepared as described in Preparation 2), there are obtained 2-phenyl-4-(4-amylphenyl)-4-ketobutyric acid, 2-phenyl - 4 - (3-bromophenyl)-4-ketobutyric acid, 2-phenyl-4-(4-chlorophenyl)-4-ketobutyric acid, 2-phenyl-4-(4-chloro-3-ethylphenyl)-4-ketobutyric acid, 2-phenyl-4-(4-ethylphenyl)-4-ketobutyric acid, 2 - phenyl-4-(2-fluorophenyl)-4-ketobutyric acid, 2-phenyl-4-(4-methylmercaptophenyl)-4-ketobutyric acid, 2-phenyl-4-(4-phenylmercaptophenyl)-4-ketobutyric acid, 2-phenyl-4-(4-phenoxyphenyl)-4-ketobutyric acid, 2 - phenyl-4-(3-trifluoromethylphenyl)-4-ketobutyric acid, 2,4 - diphenyl-3-methyl-4-ketobutyric acid, 2,4-diphenyl-3-ethyl-4-ketobutyric acid, 2,4-diphenyl-3-propyl-4-ketobutyric acid, 2-(2-bromophenyl)4-phenyl-4-ketobutyric acid, 2-(3-chlorophenyl)-4-phenyl-4-ketobutyric acid, 2-(2-chloro-6-fluorophenyl)-4-phenyl-4-ketobutyric acid, 2-(2,3-dichlorophenyl)-4-phenyl-4-ketobutyric acid, 2-p-tolyl-4-phenyl-4-ketobutyric acid, 2-(2,6-dimethylphenyl)-4-phenyl - 4 - ketobutyric acid, 2-(4-methylmercaptophenyl)-4-phenyl-4-ketobutyric acid, 2, (4-phenylmercaptophenyl)-4-phenyl-4-ketobutyric acid, 2-(4-phenoxyphenyl)-4-phenyl-4-ketobutyric acid, 2-(4-allylphenyl)-4-phenyl-4-ketobutyric acid, and 2-(4-trifluoromethylphenyl)-4-phenyl-4-ketobutyric acid, respectively.

PREPARATION 4

*2,4-diphenylbutyric acids*

Following the procedure set forth in U.S. Patent No. 3,274,213 for the preparation of 2-phenyl-4-(3-methoxyphenyl)-butyric acid, but replacing the 2-phenyl-4-(3-methoxyphenyl)-4-ketobutyric acid by the appropriately substituted 2,4-diphenyl-4-ketobutyric acid (prepared as described in Preparation 3), there are obtained 2-phenyl-4 - (4 - amylphenyl)-, 2-phenyl-4-(3-bromophenyl)-, 2-phenyl-4-(4-chlorophenyl)-, 2-phenyl-4-(4-chloro-3-ethylphenyl)-, 2 - phenyl-4-(4-ethylphenyl)-, 2-phenyl-4-(2-fluorophenyl)-, 2-phenyl-4-(4-methylmercaptophenyl)-, 2 - phenyl - 4 - (4 - phenylmercaptophenyl)-, 2-phenyl-4-(4-phenoxyphenyl)-, 2-phenyl-4-(3-trifluoromethylphenyl)-, 2,4-diphenyl-3-methyl-, 2,4-diphenyl - 3 - ethyl-, 2,4-diphenyl-3-propyl-, 2-(2-bromophenyl)-4-phenyl-, 2-(3-chlorophenyl)-4-phenyl-, 2-(2-chloro-6-fluorophenyl)-4-phenyl-, 2-(2,3-dichlorophenyl)-4-phenyl-, 2-p-tolyl-4-phenyl-, 2-(2,6-dimethylphenyl)-4-phenyl-, 2-(4-methylmercaptophenyl)-4-phenyl-, 2-(4-phenylmercaptophenyl)-4-phenyl-, 2-(4-phenoxyphenyl)-4-phenyl-, 2-(4-allylphenyl)-4-phenyl-, and 2-(4-trifluoromethylphenyl)-4-phenylbutyric acid, respectively.

PREPARATION 5

*2-phenyl-1,2,3,4-tetrahydro-1-naphthalenones*

Following the procedure set forth in U.S. Patent No. 3,274,213 for the preparation of 2-phenyl-6-methoxy-1,2,3,4-tetrahydro-1-naphthalenone, but replacing 2-phenyl-4-(3-methoxyphenyl)butyric acid by the appropriately substituted 2,4-diphenylbutyric acid (prepared as described in Preparation 4), there are obtained 2-phenyl-7-amyl-, 2-phenyl-6-bromo-, 2-phenyl-7-chloro-, 2-phenyl-7-chloro-6-ethyl-, 2-phenyl-7-ethyl-, 2-phenyl-5-fluoro-, 2-phenyl-7-methylmercapto-, 2-phenyl-7-phenylmercapto-, 2-phenyl-7-phenoxy-, 2-phenyl-6-trifluoromethyl-, 2-phenyl-3-methyl-, 2-phenyl-3-ethyl-, 2-phenyl-3-propyl-, 2-(2-bromophenyl)-, 2-(3-chlorophenyl)-, 2-(2-chloro-6-fluorophenyl)-, 2-(2,3-dichlorophenyl)-, 2-p-tolyl-, 2-(2,6-dimethylphenyl)-, 2-(4-methylmercaptophenyl)-, 2-(4-phenylmercaptophenyl)-, 2-(4-phenoxyphenyl)-, 2-(4-allylphenyl)-, and 2-(4-trifluoromethylphenyl) 1,2,3,4-tetrahydro-1-naphthalenone, respectively.

PREPARATION 6

*2-phenyl-4-methyl-1,2,3,4-tetrahydro-1-naphthalenone*

A solution of 5 g. of 2-phenyl-4-phenyl-3-ketobutyric acid in 100 ml. of ether is cooled to 0° C., and treated dropwise with stirring with 29 ml. of 3 M ethereal methyl magnesium bromide solution. When the addition is complete the mixture is stirred for several hours at room temperature and then heated under reflux for 1 hour. The reaction mixture is decomposed by the addition of ice water and dilute hydrochloric acid solution. The ethereal layer is separated, washed with aqueous ammonium chloride solution and with water, and then dried over anhydrous sodium sulfate. The dried solution is filtered, and the filtrate is evaporated to dryness and the residue is recrystallized from aqueous ethanol. There is thus obtained 2-phenyl-4-phenyl-4-hydroxyvaleric acid.

A mixture of 1 g. of 2-phenyl-4-phenyl-4-hydroxyvaleric acid, 100 mg. of p-toluenesulfonic acid and 100 ml. of benzene is heated under reflux with removal of evolved water until no further water is eliminated from the reaction mixture. The residual solution is extracted with an excess of aqueous sodium hydroxide solution and the latter is acidified with hydrochloric acid. The solid which separates is isolated by filtration, washed with water, and dried. The residue [2-phenyl-4-phenyl-3-pentenoic acid] is dissolved in ethanol and hydrogenated in the presence of palladium-on-charcoal catalyst until the uptake of hydrogen is complete. The resulting solution is filtered and the filtrate is evaporated to dryness. There is thus obtained 2-phenyl-4-phenylvaleric acid. The latter acid is then cyclized using the procedure described in Preparation 5 to give 2-phenyl-4-methyl-1,2,3,4-tetrahydro-1-naphthalenone.

Examples 1 through 48 below illustrate the preparation of representative 2-phenyl-1-[(p-tertiaryaminoalkoxy)phenyl]-3,4-dihydronaphthalene free bases and acid addition salts, quaternary ammonium salts, N-oxides, and N-oxide acid addition salts thereof. The corresponding 2-phenyl-1-[o- and m-(tertiaryaminoalkoxy)phenyl]-3,4-dihydronaphthalene free bases and acid addition salts, quaternary ammonium salts, N-oxides, and N-oxide acid addition salts thereof are prepared as follows. The appropriate o- and m-(tertiaryaminoalkoxy)bromobenzenes are substituted for the corresponding p-(tertiaryaminoalkoxy)bromobenzenes in Examples 1 through 46 to obtain the corresponding 2-phenyl-1-[o- and m-(tertiaryaminoalkoxy)phenyl]-3,4-dihydronaphthalene free bases and addition salts thereof. The free bases thus obtained are substituted for the corresponding 2-phenyl-1[(p-tertiaryaminoalkoxy)phenyl] - 3,4 - dihydronaphthalene free bases in Examples 47 and 48 to obtain the corresponding quaternary ammonium salts, N-oxides, and N-oxide acid addition salts.

EXAMPLE 1

*1 - [p - (2 - diethylaminoethoxy)phenyl] - 2 - phenyl-3,4-dihydronaphthalene and the hydrochloride thereof*

A solution of 11.0 g. (0.05 mole) of 2-phenyl-1,2,3,4-tetrahydro-1-naphthaleneone (Newman, J. Am. Chem. Soc. 60, 2947, 1938) in 100 ml. of tetrahydrofuran was added to the Grignard reagent prepared from 13.6 g. (0.05 mole) of p-(2-diethylaminoethoxy)bromobenzene and 1.24 g. (0.05 mole) of magnesium in 130 ml. of tetrahydrofuran. The resulting mixture was heated for 16 hours under reflux and was then allowed to cool and treated with 5 ml. of water. The resulting gel was removed by filtration and the filtrate was diluted with ether, washed with water and evaporated to dryness. The residue was taken up in ether and the solution so obtained was washed with 0.5 N hydrochloric acid. The acid extract was extracted with 250 ml. of chloroform and the chloroform extract was evaporated to dryness. The residue was dissolved in 250 ml. of benzene and the benzene solution was heated with 250 mg. of p-toluenesulfonic acid for 2 hours under a Deane-Stark trap. The solution was then allowed to cool and was washed with aqueous sodium bircarbonate solution. The washed benzene solution was evaporated to dryness and the residue was dissolved in ether. The ether solution was extracted with 0.5 N hydrochloric acid and the acid extract was extracted with chloroform. The chloroform extract was evaporated to dryness and the residue was recrystallized twice from a mixture of methylene chloride and benzene. There was thus obtained 6.30 g. of 1-[p-(2-diethylaminoethoxy)phenyl]-1-hydroxy - 2 - phenyl - 1,2,3,4-tetrahydronaphthalene hydrochloride in the form of a crystalline solid having a melting point of 180 to 182° C. (with decomposition).

*Analysis.*—Calcd. for $C_{28}H_{34}ClNO_2$: C, 74.39; H, 7.58; N, 3.10. Found: C, 74.04; H, 7.55; N, 2.93.

One-half gram of the above compound was heated under a gentle stream of nitrogen in an oil bath at 200 to 210° C. until no more effervescene occurred. The residual glass was crystallized by trituration with ethyl acetate. The product was then recrystallized from a mixture of methylene chloride and ethyl acetate. There was thus obtained 0.45 g. of 1-[p-(2-diethylaminoethoxy)phenyl] - 2 - phenyl - 3,4 - dihydronaphthalene hydrochloride in the form of a crystalline solid having a melting point of 174 to 177° C. An analytical sample having a melting point of 174 to 178° C. was obtained by two further recrystallizations from the same solvent mixture. The ultraviolet spectrum of this compound (ethanol solution) exhibited maxima at 230, 238 (sh.), 253 (sh.), 280 (sh.), and 299 millimicrons.

*Analysis.*—Calcd. for $C_{28}H_{32}ClNO$ solvate: C, 76.84; H, 7.29; N, 3.16. Found: C, 76.13; H, 7.21; N, 3.34.

A solution of 1 g. of the above hydrochloride in water was made basic by the addition of aqueous sodium hydroxide solution. The basic solution was extracted with ether, washed with water and dried over anhydrous sodium sulfate. The dried solution was filtered and the filtrate was evaporated to dryness. The residue was recrystallized from aqueous ethanol to obtain 1-[p-(2-diethylaminoethoxy)phenyl]-2-phenyl - 3,4 - dihydronaphthalene in the form of a crystalline solid.

EXAMPLE 2

*1-[p-(2-pyrrolidinoethoxy)phenyl]-2-phenyl-3,4-dihydronaphthalene and the hydrochloride thereof*

Using the procedure described in Example 1, but replacing p-(2-diethylaminoethoxy)bromobenzene with p-(2-pyrrolidinoethoxy)bromobenzene (13.5 g.), there was obtained 1-[p-(2-pyrrolidinoethoxy)phenyl] - 1 - hydroxy-2-phenyl-1,2,3,4-tetrahydronaphthalene hydrochloride in the form of a crystalline solid; M.P. 208–209° C. (with decomposition). That compound was heated at 210° C. for 30 minutes to give a product which was crystallized by triturating with ethyl acetate and then recrystallized from a mixture of methylene chloride and ethyl acetate to give 1-[p-(2-pyrrolidinoethoxy)phenyl]-2-phenyl-3,4-dihydronaphthalene hydrochloride in the form of a crystalline solid; M.P. 203–204° C.

The corresponding free base was obtained from the above hydrochloride using the procedure described in Example 1.

EXAMPLE 3

*1-[p-(2-diethylaminoethoxy)phenyl]-2-o-tolyl-3-methyl-3,4-dihydronaphthalene and the hydrochloride thereof*

Using the procedure described in Example 1, but replacing 2-phenyl-1,2,3,4-tetrahydro-1-napthalenone by 2-o-tolyl-3 - methyl - 1,2,3,4-tetrahydro - 1-naphthalenone (Newman, J. Am. Chem. Soc. 62, 2295, 1940) there is obtained 1-[p-(2-diethylaminoethoxy)phenyl] - 2-o-toly-3-methyl-3,4-dihydronaphthalene and the hydrochloride thereof.

EXAMPLE 4

*1-[p-(2-diethylaminoethoxy)phenyl]-2-phenyl-7-amyl-3,4-dihydronaphthalene and the hydrochloride thereof*

Using the procedure described in Example 1, but replacing 2-phenyl-1,2,3,4-tetrahydro - 1 - naphthalenone by 2-phenyl-7-amyl - 1,2,3,4-tetrahydro - 1-naphthalenone, there is obtained 1-[p-2-diethylaminoethoxy)phenyl]-2-phenyl-7-amyl-3,4-dihydronaphthalene and the hydrochloride thereof.

EXAMPLE 5

*1-[p-(2-diethylaminoethoxy)phenyl]-2-phenyl-6-bromo-3,4-dihydronaphthalene and the hydrochloride thereof*

Using the procedure described in Example 1, but replacing 2-phenyl-1,2,3,4-tetrahydro-1-naphthalenone by 2-phenyl - 6-bromo - 1,2,3,4-tetrahydro-1-naphthalenone, there is obtained 1-[p-(2-diethylaminoethoxy)phenyl]-2-phenyl-6-bromo-3,4-dihydronaphthalene and the hydrochloride thereof.

EXAMPLE 6

*1-[p-(2-diethylaminoethoxy)phenyl]-2-phenyl-7-chloro-3,4-dihydronaphthalene and the hydrochloride thereof*

Using the procedure described in Example 1, but replacing 2-phenyl-1,2,3,4-tetrahydro-1-naphthalenone by 2-phenyl-7-chloro - 1,2,3,4-tetrahydro - 1-naphthalenone, there is obtained 1-[p-(2-diethylaminoethoxy)phenyl]-2-phenyl -7-chloro-3,4-dihydronaphthalene and the hydrochloride thereof.

EXAMPLE 7

*1-[p-(2-diethylaminoethoxy)phenyl]-2-phenyl-7-chloro-6-ethyl-3,4-dihydronaphthalene and the hydrochloride thereof*

Using the procedure described in Example 1, but replacing 2-phenyl-1,2,3,4-tetrahydro-1-naphthalenone by 2-phenyl-7-chloro-6-ethyl - 1,2,3,4-tetrahydro-1-naphthalenone, there is obtained 1-[p-(2-diethylaminoethoxy)phenyl - 2-phenyl - 7-chloro - 6-ethyl-3,4-dihydronaphthalene and the hydrochloride thereof.

EXAMPLE 8

*1-[p-(2-diethylaminoethoxy)phenyl]-2-phenyl-7-ethyl-3,4-dihydronaphthalene and the hydrochloride thereof*

Using the procedure described in Example 1, but replacing 2-phenyl-1,2,3,4-tetrahydro-1-naphthalenone by 2-phenyl-7-ethyl - 1,2,3,4-tetrahydro - 1-naphthalenone, there is obtained 1-[p-(2-diethylaminoethoxy)phenyl]-2-phenyl-7-ethyl-3,4-dihydronaphthalene and the hydrochloride thereof.

EXAMPLE 9

*1-[p-(2-diethylaminoethoxy)phenyl]-2-phenyl-5-fluoro-3,4-dihydronaphthalene and the hydrochloride thereof*

Using the procedure described in Example 1, but replacing 2-phenyl-1,2,3,4-tetrahydro-1-naphthalenone by 2-phenyl-5-fluoro - 1,2,3,4-tetrahydro - 1-naphthalenone, there is obtained 1-[p-(2-diethylaminoethoxy)phenyl]-2-phenyl-5-fluoro-3,4-dihydronaphthalene and the hydrochloride thereof.

EXAMPLE 10

*1-[p-(2-diethylaminoethoxy)phenyl]-2-phenyl-7-methylmercapto-3,4-dihydronaphthalene and the hydrochloride thereof*

Using the procedure described in Example 1, but replacing 2-phenyl - 1,2,3,4-tetrahydro-1-naphthalenone by 2-phenyl-7-methylmercapto - 1,2,3,4-tetrahydro - 1-naphthalenone, there is obtained 1-[p-(2-diethylaminoethoxy)-phenyl] - 2-phenyl-7-methylmercapto - 3,4-dihydronaphthalene and the hydrochloride thereof.

EXAMPLE 11

*1-[p-(2-diethylaminoethoxy)phenyl]-2-phenyl-7-phenylmercapto-3,4-dihydronaphthalene and the hydrochloride thereof*

Using the procedure described in Example 1, but replacing 2-phenyl-1,2,3,4-tetrahydro-1-naphthalenone by 2-phenyl-7-phenylmercapto - 1,2,3,4-tetrahydro - 1-naphthalenone, there is obtained 1-[p-(2-diethylaminoethoxy)-phenyl]-2-phenyl - 7-methylmercapto - 3,4-dihydronaphthalene and the hydrochloride thereof.

EXAMPLE 12

*1-[p-(2-diethylaminoethoxy)phenyl-2-phenyl-7-phenoxy-3,4-dihydronaphthalene and the hydrochloride thereof*

Using the procedure described in Example 1, but replacing 2-phenyl-1,2,3,4-tetrahydro-1-naphthalenone by 2-phenyl-7phenoxy-1,2,3,4-tetrahydro - 1 - naphthalenone there is obtained 1-[p-(2-diethylaminoethoxy)phenyl]-2-phenyl - 7-phenoxy - 3,4-dihydronaphthalene and the hydrochloride thereof.

EXAMPLE 13

*1-[p-(2-diethylaminoethoxy)phenyl] - 2 - phenyl-6-trifluoromethyl-3,4-dihydronaphthalene and the hydrochloride thereof*

Using the procedure described in Example 1, but replacing 2-phenyl-1,2,3,4-tetrahydro-1-naphthalenone by 2-phenyl - 6-trifluoromethyl - 1,2,3,4-tetrahydro-1-naphthalenone, there is obtained 1-[p-(2-diethylaminoethoxy)-phenyl] - 2-phenyl - 6-trifluoromethyl - 3,4-dihydronaphthalene and the hydrochloride thereof.

EXAMPLE 14

*1-[p-(2-diethylaminoethoxy)phenyl]-2-phenyl-3-methyl-3,4-dihydronaphthalene and the hydrochloride thereof*

Using the procedure described in Example 1, but replacing 2-phenyl-1,2,3,4-tetrahydro-1-naphthalenone by 2-phenyl - 3-methyl - 1,2,3,4-tetrahydro-1-naphthalenone, there is obtained 1-[p-(2-diethylaminoethoxy)phenyl]-2-phenyl-3-methyl-3,4-dihydronaphthalene and the hydrochloride thereof.

EXAMPLE 15

*1-[p-(2-diethylaminoethoxy)phenyl]-2-phenyl-3-ethyl-3,4-dihydronaphthalene and the hydrochloride thereof*

Using the procedure described in Example 1, but replacing 2-phenyl-1,2,3,4-tetrahydro-1-naphthalenone by 2-phenyl-3-ethyl - 1,2,3,4-tetrahydro - 1-naphthalenone, there is obtained 1-[p-(2-diethylaminoethoxy)phenyl]-2-phenyl-3-ethyl-3,4-dihydronaphthalene and the hydrochloride thereof.

EXAMPLE 16

*1-[p-(2-diethylaminoethoxy)phenyl]-2-phenyl-3-propyl-3-4-dihydronaphthalene and the hydrochloride thereof*

Using the procedure described in Example 1, but replacing 2-phenyl-1,2,3,4-tetrahydro-1-naphthalenone by 2 - phenyl - 3 - propyl - 1,2,3,4 - tetrahydro - 1 - naphthalenone, there is obtained 1-[p-(2-diethylaminoethoxy) phenyl] - 2 - phenyl - 3 - propyl - 3,4 - dihydronaphthalene and the hydrochloride thereof.

EXAMPLE 17

*1 - [p - (2 - diethylaminoethoxy)phenyl] - 2 - (2 - bromophenyl)-3,4-dihydronaphthalene and the hydrochloride thereof*

Using the procedure described in Example 1, but replacing 2-phenyl-1,2,3,4-tetrahydro-1-naphthalenone by 2 - (2 - bromophenyl) - 1,2,3,4 - tetrahydro - 1 - naphthalenone, there is obtained 1-[p-(2-diethylaminoethoxy) phenyl] - 2 - (2 - bromophenyl) - 3,4 - dihydronaphthalene and the hydrochloride thereof.

EXAMPLE 18

*1 - [p - (2 - diethylaminoethoxy)phenyl] - 2 - (4 - chlorophenyl)-3,4-dihydronaphthalene and the hydrochloride thereof*

Using the procedure described in Example 1, but replacing 2-phenyl-1,2,3,4-tetrahydro-1-naphthalenone by 2 - (4 - chlorophenyl) - 1,2,3,4 - tetrahydro - 1 - naphthalenone, there is obtained 1-[p-(2-diethylaminoethoxy) phenyl] - 2 - (4 - chlorophenyl) - 3,4 - dihydronaphthalene and the hydrochloride thereof.

EXAMPLE 19

*1 - [p - (2 - diethylaminoethoxy)phenyl] - 2 - (2 - chloro-6-fluorophenyl)-3,4-dihydronaphthalene and the hydrochloride thereof*

Using the procedure described in Example 1, but replacing 2-phenyl-1,2,3,4-tetrahydro-1-naphthalenone by 2 - (2-chloro - 6 - fluorophenyl) - 1,2,3,4 - tetrahydro - 1-naphthalenone, there is obtained 1-[p-(2-diethylaminoethoxy)phenyl] - 2 - (2 - chloro - 6 - fluorophenyl) - 3,4-dihydronaphthalene and the hydrochloride thereof.

EXAMPLE 20

*1 - [p - (2 - diethylaminoethoxy)phenyl] - 2 - (2,3 - dichlorophenyl)-3,4-dihydronaphthalene and the hydrochloride thereof*

Using the procedure described in Example 1, but replacing 2-phenyl-1,2,3,4-tetrahydro-1-naphthalenone by 2 - (2,3 - dichlorophenyl) - 1,2,3,4 - tetrahydro - 1 - naphthalenone, there is obtained 1-[p-(2-diethylaminoethoxy) phenyl] - 2 - (2,3 - dichlorophenyl) - 3,4 - dihydronaphthalene and the hydrochloride thereof.

EXAMPLE 21

*1-[p-(2-diethylaminoethoxy)phenyl]-2-p-tolyl-3,4-dihydonaphthalene and the hydrochloride thereof*

Using the procedure described in Example 1, but replacing 2-phenyl-1,2,3,4-tetrahydro-1-naphthalenone by 2-p-tolyl-1,2,3,4-tetrahydro-1-naphthalenone, there is obtained 1 - [p - (2 - diethylaminoethoxy)phenyl] - 2 - p-tolyl-3,4-dihydronaphthalene and the hydrochloride thereof.

EXAMPLE 22

*1 - [p - (2 - diethylaminoethoxy)phenyl] - 2 - (2,6 - dimethylphenyl)-3,4-dihydronaphthalene and the hydrochloride thereof*

Using the procedure described in Example 1, but replacing 2-phenyl-1,2,3,4-tetrahydro-1-naphthalenone by 2 - (2,6 - dimethylphenyl) - 1,2,3,4 - tetrahydro - 1 - naphthalenone, there is obtained 1-[p-(2-diethylaminoethoxy) phenyl] - 2 - (2,6 - dimethylphenyl) - 3,4 - dihydronaphthalene and the hydrochloride thereof.

EXAMPLE 23

*1 - [p - (2 - diethylaminoethoxy)phenyl] - 2 - (4 - methylmercaptophenyl)-3,4dihydronaphthalene and the hydrochloride thereof*

Using the procedure described in Example 1, but replacing 2-phenyl-1,2,3,4-tetrahydro-1-naphthalenone by 2 - (4 - methylmercaptophenyl) - 1,2,3,4 - tetrahydro - 1-naphthalenone, there is obtained 1-[p-(2-diethylaminoethoxy)phenyl] - 2 - (4 - methylmercaptophenyl) - 3,4-dihydronaphthalene and the hydrochloride thereof.

EXAMPLE 24

*1 - [p - (2 - diethylaminoethoxy)phenyl] - 2 - (4 - phenylmercaptophenyl)-3,4-dihydronaphthalene and the hydrochloride thereof*

Using the procedure described in Example 1, but replacing 2-phenyl-1,2,3,4-tetrahydro-1-naphthalenone by 2 - (4 - phenylmercaptophenyl) - 1,2,3,4 - tetrahydro - 1-naphthalenone, there is obtained 1-[p-(2-diethylaminoethoxy)phenyl] - 2 - (4 - phenylmercaptophenyl) - 3,4-dihydronaphthalene and the hydrochloride thereof.

EXAMPLE 25

*1 - [p - (2 - diethylaminoethoxy)phenyl] - 2 - (4 - phenoxyphenyl)-3,4-dihydronaphthalene and the hydrochloride thereof*

Using the procedure described in Example 1, but replacing 2-phenyl-1,2,3,4-tetrahydro-1-naphthalenone by 2 - (4 - phenoxyphenyl) - 1,2,3,4 - tetrahydro - 1 - naphthalenone, there is obtained 1-[p-(2-diethylaminoethoxy) phenyl]-2-(4-phenoxyphenyl)-3,4-dihydronaphthalene and the hydrochloride thereof.

EXAMPLE 26

*1-[p-(2-diethylaminoethoxy)phenyl]-2-(4-allylphenyl)-3,4-dihydronaphthalene and the hydrochloride thereof*

Using the procedure described in Example 1, but replacing 2-phenyl-1,2,3,4-tetrahydro-1-naphthalenone by 2 - (4 - allylphenyl) - 1,2,3,4 - tetrahydro - 1 - naphthalenone, there is obtained 1-[p-(2-diethylaminoethoxy) phenyl] - 2 - (4 - allylphenyl) - 3,4 - dihydronaphthalene and the hydrochloride thereof.

EXAMPLE 27

*1 - [p - (2 - diethylaminoethoxy)phenyl] - 2 - (4 - trifluoromethylphenyl)-3,4-dihydronaphthalene and the hydrochloride thereof*

Using the procedure described in Example 1, but replacing 2-phenyl-1,2,3,4-tetrahydro-1-naphthalenone by 2 - (4 - trifluoromethylphenyl) - 1,2,3,4 - tetrahydro - 1-naphthalenone, there is obtained 1-[p-(2-diethylaminoethoxy)phenyl] - 2 - (4 - trifluoromethylphenyl) - 3,4-dihydronaphthalene and the hydrochloride thereof.

EXAMPLE 28

*1-[p-(2-dimethylaminoethoxy)phenyl]-2-phenyl-3,4-dihydronaphthalene and the hydrochloride thereof*

Using the procedure described in Example 1, but replacing p-(2-diethylaminoethoxy)bromobenzene by p-(2-dimethylaminoethoxy)bromobenzene, there is obtained 1 - [p-(2-dimethylaminoethoxy)phenyl] - 2 - phenyl - 3,4-dihydronaphthalene and the hydrochloride thereof.

EXAMPLE 29

*1-[p-(2-diethylaminopropoxy)phenyl]-2-phenyl-3,4-dihydronaphthalene and the hydrochloride thereof*

Using the procedure described in Example 1, but replacing p-(2-diethylaminoethoxy)bromobenzene by p-(2-diethylaminopropoxy)bromobenzene there is obtained 1 - [p - (2 - diethylaminopropoxy)phenyl] - 2 - phenyl-3,4-dihydronaphthalene and the hydrochloride thereof.

EXAMPLE 30

*1-[p-(2-dibutylaminoethoxy)phenyl]-2-phenyl-3,4-dihydronaphthalene and the hydrochloride thereof*

Using the procedure described in Example 1, but replacing p-(2-diethylaminoethoxy)bromobenzene by p-(2-dibutylaminoethoxy)bromobenzene, there is obtained 1-[p - (2 - dibutylaminoethoxy)phenyl] - 2 - phenyl - 3,4-dihydronaphthalene and the hydrochloride thereof.

EXAMPLE 31

*1-[p-(2-N-methyl-N-ethylaminoethoxy)phenyl]-2-phenyl-3,4-dihydronaphthalene and the hydrochloride thereof*

Using the procedure described in Example 1, but replacing p-(2 - diethylaminoethoxy)bromobenzene by p-(2-N - methyl-N-ethylaminoethoxy)bromobenzene, there is obtained 1 - [p-(2 - N-methyl - N-ethylaminoethoxy)phenyl]-2-phenyl-3,4-dihydronaphthalene and the hydrochloride thereof.

EXAMPLE 32

*1-[p-(3-diethylaminobutoxy)phenyl]-2-phenyl-3,4-dihydronaphthalene and the hydrochloride thereof*

Using the procedure described in Example 1, but replacing p-(2 - diethylaminoethoxy)bromobenzene by p-(3-diethylaminobutoxy)bromobenzene, there is obtained 1-[p-(3-diethylaminobutoxy)phenyl] - 2 - phenyl-3,4-dihydronaphthalene and the hydrochloride thereof.

EXAMPLE 33

*1-[p-(5-dimethylaminopentoxy)phenyl]-2-phenyl-3,4-dihydronaphthalene and the hydrochloride thereof*

Using the procedure described in Example 1, but replacing p-(2 - diethylaminoethoxy)bromobenzene by p-(5 - dimethylaminopentoxy)bromobenzene, there is obtained 1 - [p - (5 - dimethylaminopentoxy)phenyl]-2-phenyl - 3,4 - dihydronaphthalene and the hydrochloride thereof.

EXAMPLE 34

*1-[p-(2-diethylaminopentoxy)phenyl]-2-phenyl-3,4-dihydronaphthalene and the hydrochloride thereof*

Using the procedure described in Example 1, but replacing p-(2-diethylaminoethoxy)bromobenzene by p-(2-diethylaminopentoxy)bromobenzene, there is obtained 1-[p-(2 - ethylaminopentoxy)phenyl] - 2 - phenyl-3,4-dihydronaphthalene and the hydrochloride thereof.

EXAMPLE 35

*1-[p-(6-dimethylaminohexyloxy)phenyl]-2-phenyl-3,4-dihydronaphthalene and the hydrochloride thereof*

Using the procedure described in Example 1, but replacing p-(2 - diethylaminoethoxy)bromobenzene by p-(6 - dimethylaminohexyloxy)bromobenzene, there is obtained 1 - [p-(6 - dimethylaminohexyloxy)phenyl] - 2 - phenyl - 3,4-dihydronaphthalene and the hydrochloride thereof.

EXAMPLE 36

*1-[p-(2-pyrrolidinoethoxy)phenyl]-2-(4-chlorophenyl)-3,4-dihydronaphthalene and the hydrochloride thereof*

Using the procedure described in Example 1, but replacing p-(2 - diethylaminoethoxy)bromobenzene by p-(2-pyrrolidinoethoxy)bromobenzene and 2-phenyl-1,2,3,4-tetrahydro - 1-naphthalenone by 2-(4 - chlorophenyl)-1,2,3,4-tetrahydro - 1 - naphthalenone, there is obtained 1-[p - (2 - pyrrolidinoethoxy)phenyl] - 2-(4 - chlorophenyl)-3,4-dihydronaphthalene and the hydrochloride thereof.

EXAMPLE 37

*1-{p-[3 - (2,2 - dimethylpyrrolidino)propoxy]phenyl}-2-phenyl-3,4-dihydronaphthalene and the hydrochloride thereof*

Using the procedure described in Example 1, but replacing p-(2 - diethylaminoethoxy)bromobenzene by p-[3 - (2,2 - dimethylpyrrolidino)propoxy]bromobenzene, there is obtained 1-{p-[3 - (2,2 - dimethylpyrrolidino)propoxy]phenyl} - 2 - phenyl - 3,4-dihydronaphthalene and the hydrochloride thereof.

EXAMPLE 38

*1-[p-(2-piperidinoethoxy)phenyl]-2-phenyl-3,4-dihydronaphthalene and the hydrochloride thereof*

Using the procedure described in Example 1, but replacing p-(2 - diethylaminoethoxy)bromobenzene by p-(2 - piperidinoethoxy)bromobenzene, there is obtained 1 - [p - (2-piperidinoethoxy)phenyl]-2-phenyl-3,4-dihydronaphthalene and the hydrochloride thereof.

EXAMPLE 39

*1-[p-(2-morpholinoethoxy)phenyl]-2-phenyl-3,4-dihydronaphthalene and the hydrochloride thereof*

Using the procedure described in Example 1, but replacing p-(2 - diethylaminoethoxy)bromobenzene by p-(2 - morpholinoethoxy)bromobenzene, there is obtained 1-[p-(2-morpholinoethoxy)phenyl] - 2 - phenyl-3,4-dihydronaphthalene and the hydrochloride thereof.

EXAMPLE 40

*1-{p - [2-(1' - methyl-4'-piperazino)ethoxy]phenyl}-2-phenyl-3, - dihydronaphthalene and the hydrochloride thereof*

Using the procedure described in Example 1, but replacing p-(2 - diethylaminoethoxy)bromobenzene by p-[2 - (1'-methyl - 4' - piperazino)ethoxy]bromobenzene, there is obtained 1-{p - [2-(1'-methyl - 4' - piperazinoethoxy]phenyl}-2-phenyl - 3,4 - dihydronaphthalene and the hydrochloride thereof.

EXAMPLE 41

*1-[p-(2-hexamethyleneiminoethoxy)phenyl]-2-phenyl-3,4-dihydronaphthalene and the hydrochloride thereof*

Using the procedure described in Example 1, but replacing p-(2 - diethylaminoethoxy)bromobenzene by p-(2 - hexamethyleneiminoethoxy)bromobenzene, there is obtained 1-[p-(2 - hexamethyleneiminoethoxy)phenyl]-2-phenyl - 3,4 - dihydronaphthalene and the hydrochloride thereof.

EXAMPLE 42

*1-[p-(2-homopiperazinoethoxy)phenyl]-2-phenyl-3,4-dihydronaphthalene and the hydrochloride thereof*

Using the procedure described in Example 1, but replacing p-(2 - diethylaminoethoxy)bromobenzene by p-(2 - homopiperazinoethoxy)bromobenzene, there is obtained 1-[p-(2 - homopiperazinoethoxy)phenyl]-2-phenyl-3,4-dihydronaphthalene and the hydrochloride thereof.

EXAMPLE 43

*1-[p-(2-homomorpholinoethoxy)phenyl]-2-phenyl-3,4-dihydronaphthalene and the hydrochloride thereof*

Using the procedure described in Example 1, but replacing p-(2 - diethylaminoethoxy)bromobenzene by p-(2 - homomorpholinoethoxy)bromobenzene, there is obtained 1 - [p - (2 - homomorpholinoethoxy)phenyl]-2-phenyl - 3,4-dihydronaphthalene and the hydrochloride thereof.

EXAMPLE 44

*1-[p-(2-diethylaminoethoxy)phenyl]-2-phenyl-6-hydroxy-3,4-dihydronaphthalene and the hydrochloride thereof*

(A) *2 - phenyl - 6 - hydroxy-1,2,3,4 - tetrahydro-1-naphthalenone.*—Heating a mixture of 2 - phenyl-6-methoxy - 1,2,3,4 - tetrahydro - 1-naphthalenone with aluminum bromide in benzene according to the procedure described by Sam, J. Am. Chem. Soc. 82, 5205, 1960, yields 2-phenyl-6-hydroxy-1,2,3,4-tetrahydro-1-naphthalenone in the form of a crystalline compound.

(B) *2-phenyl - 6 - (2 - tetrahydropyranyloxy)-1,2,3,4-tetrahydro-1-naphthalenone.*—A solution of 2-phenyl-6-hydroxy-1,2,3,4-tetrahydro-1-naphthalenone in ether is treated with an equimolar quantity of 2,3-dihydropyran and one drop of concentrated hydrochloric acid. The mixture so obtained is allowed to stand for several hours, washed with very dilute aqueous sodium hydroxide solution, then with water, and taken to dryness. There is thus obtained 2 - phenyl - 6-(2-tetrahydropyranyloxy)-1,2,3,4-tetrahydro-1-naphthalenone.

(C) *1-[p-(2 - diethylaminoethoxy)phenyl] - 2-phenyl-6-hydroxy-3,4-dihydronaphthalene and the hydrochloride thereof.*—Using the procedure described in Example 1, but replacing 2 - phenyl-1,2,3,4-tetrahydro - 1-naphthalenone by 2-phenyl - 6-(2-tetrahydropyranyloxy) - 1,2,3,4-tethahydro-1-naphthalenone and allowing the 0.5 N hydrochloric acid extract obtained in the working up to stand for several hours to enable the hydrolysis of the tetrahydropyranyl ether to proceed to completion before finally extracting with methylene chloride, there is obtained 1-[p-(2 - diethylaminoethoxy)phenyl] - 2 - phenyl-6-hydroxy - 3,4 - dihydronaphthalene hydrochloride. The latter compound is converted to the corresponding free base using the procedure described in the last paragraph of Example 1.

EXAMPLE 45

*1-[p-(2 - piperidnoethoxy)phenyl] - 2 - phenyl-6-hydroxy-3,4-dihydronapthalene and the hydrochloride thereof*

(A) *2-phenyl-6-hydroxy - 1,2,3,4 - tetrahydro-1-naphthalenone.*—Aluminum chloride (2.66 g.) was added to a solution of 2-phenyl-6-methoxy-1,2,3,4-tetrahydro-1-naphthalenone (2.52 g.) in 50 ml. of benzene. The resulting mixture was boiled under reflux for 4 hours. After cooling, the mixture was poured onto ice. Diethyl ether and 2.5 N hydrochloric acid were added, and the mixture was agitated. The non-aqueous layer was separated, washed with water and then with saturated aqueous sodium bicarbonate solution, and dried. Evaporation gave 2.17 g. of solid which was recrystallized from chloroform to give 2-phenyl-6-hydroxy-1,2,3,4-tetrahydro-1-naphthalenone; M.P. 179–184° C.

(B) *2-phenyl-6-(2-tetrahydropyranyloxy)-1,2,3,4-tetrahydro-1-naphthalenone.*—A mixture of 2,3-dihydropyran (5 ml.), 2-phenyl-6-hydroxy-1,2,3,4-tetrahydro-1-naphthalenone (4.60 g.), p-toluenesulfonic acid (0.1 g.), and 200 ml. of diethyl ether was stirred at about 25° C. for 18 hours. The diethyl ether was then removed by distillation. Diethyl ether (80 ml.) was added to the residue and the mixture was filtered to give 4.0 g. of 2-phenyl-6-(2-tetrahydropyranyloxy) - 1,2,3,4 - tetrahydro-1-naphthalenone; M.P. 96° C.

(C) *1 - [p - (2 - piperidinoethoxy)phenyl]-2-phenyl-6-hydroxy - 3,4 - dihydronapthalene and the hydrochloride thereof.*—Using the procedure described in Example 1, p-(2-piperidinoethoxy)bromobenzene (5.72 g.) and magnesium (0.50 g.) were reacted in the presence of 60 ml. of tetrahydrofuran to produce the corresponding Grignard reagent. A solution of 2-phenyl-6-(2-tetrahydropyranyloxy)-1,2,3,4-tetrahydro-1-naphthalenone (4.0 g.) in 50 ml. of tetrahydrofuran was added to the solution of the Grignard reagent, and the mixture was boiled under reflux for several hours. After cooling, 3 ml. of water was added and the resulting gel was removed by filtration. The organic solution was washed with water and evaporated. The dry residue was triturated with a mixture of 2.5 N hydrochloric acid and diethyl ether. The two layers were then separated. The gum which precipitated was dissolved in a few drops of acetone and added to the aqueous acid layer. A crystalline solid gradually precipitated from the aqueous acid layer. Filtration gave 1.70 g. of 1 - [p - (2 - piperidinoethoxy)phenyl]-2-phenyl-6-hydroxy-3,4-dihydronaphthalene hydrochloride; M.P. 147–153° C. Two recrystallizations from a mixture of methanol and 2.5 N hydrochloric acid gave the same material solvated with an equimolar amount of methanol; M.P. 170–174° C.

*Analysis.*—Calcd. for $C_{28}H_{32}ClNO_2·CH_3OH$: C, 73.47; H, 7.34. Found: C, 73.85; H, 7.08.

The corresponding free base is obtained by solution of the hydrochloride in water followed by addition of aqueous sodium hydroxide solution. The basic solution is extracted with diethyl ethyl. The diethyl ether extract is dried and evaporated to give 1-[p-(2-piperidinoethoxy)phenyl]-2-phenyl-6-hydroxy-3,4-dihydronaphthalene free base.

EXAMPLE 46

*1-[p-(2-pyrrolidinoethoxy)phenyl]-2-phenyl-6-hydroxy-3,4-dihydronapthalene and the hydrochloride thereof*

Following the procedure described in Example 45C but replacing the p-(2-piperidinoethoxy)bromobenzene with the molecular equivalent of p-(2-pyrrolidinoethoxy) bromobenzene, there was obtained 1-[p-(2-pyrrolidinoethoxy)phenyl]-2-phenyl-6-hydroxy - 3,4 - dihydronaphthalene hydrochloride in the form of a crystalline monohydrate; M.P. 165–167.5° C. The corresponding free base is also obtained as described in Example 45C.

EXAMPLE 47

*1-[p-(2-diethylaminoethoxy)phenyl]-2-phenyl 3,4-dihydronaphthalene methiodide*

A solution of 1 g. of 1-[p-(2-diethylaminoethoxy)phenyl]-2-phenyl-3,4-dihydronaphthalene in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of ethyl acetate and ether. There is thus obtained 1-[p-(2-diethylaminoethoxy)phenyl]-2-phenyl - 3,4 - dihydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1-[p-(2-diethylaminoethoxy) phenyl]-2-phenyl-3,4-dihydronaphthalene.

Similarly, using the procedure described in Example 47, but replacing 1-[p-(2-diethylaminoethoxy)phenyl]-2-phenyl-3,4-dihydronaphthalene by any of the free bases prepared as described in Examples 2 to 46, inclusive, there are prepared the corresponding methiodides and like quaternary ammonium salts.

EXAMPLE 48

*1-[p-(2-diethylaminoethoxy)phenyl] - 2 - phenyl-3,4-dihydronaphthalene N-oxide and the hydrochloride thereof*

To a solution of 1-[p-(2-diethylaminoethoxy)phenyl]-2-phenyl-3,4-dihydronaphthalene in 50 ml. of absolute ethanol is added an equimolar quantity of 30% hydrogen peroxide. The mixture is allowed to stand for 4 days at room temperature, at the end of which time the mixture is shaken with 0.5 g. of platinum oxide until a test for peroxide is negative. The mixture is then filtered and the filtrate is evaporated to dryness under reduced pressure. The residue is recrystallized from a mixture of chloroform and ethyl acetate. There is thus obtained 1-[p-(2-diethylaminoethoxy)phenyl] - 2 - phenyl - 3,4 - dihydronaphthalene N-oxide.

The N-oxide so obtained is converted to the corresponding hydrochloride by dissolving the N-oxide in ether and treating the ether solution with an excess of a saturated solution of hydrogen chloride in ether. The solid which separates is isolated by filtration. There is thus obtained 1 - [p-(2-diethylaminoethoxy)phenyl]-2-phenyl-3,4-dihydronaphthalene N-oxide hydrochloride.

Using the above procedure, but replacing 1-[p-(2-diethylaminoethoxy)phenyl] - 2 - phenyl - 3,4-dihydronaphthalene by any of the free bases prepared as described in Examples 2 to 46, inclusive, there are obtained the corresponding N-oxides and the hydrochlorides thereof.

EXAMPLE 49

Tablet

Ten thousand tablets for oral administration to small animals, each tablet containing 100 mg. of 1-[p-(2-pyrrolidinoethoxy)phenyl]-2-phenyl-3,4-dihydronaphthalene hydrochloride, are prepared from the following ingredients:

| | Grams |
|---|---|
| 1-[p-(2-pyrrolidinoethoxy)phenyl]-2-phenyl-3,4-dihydronaphthalene hydrochloride | 1000 |
| Dicalcium phosphate | 2000 |
| Corn starch | 300 |
| Talc, bolted | 150 |
| Magnesium stearate | 20 |

The active ingredient, dicalcium phosphate, starch, and talc are mixed thoroughly and then granulated with a 4 percent aqueous solution of 1500 cps. methyl cellulose. The granules are dried, mixed with the stearate, and the resulting mixture compressed into tablets of the proper weight.

In the stimulatory treatment of a 25-lb. lethargic obese dog, one such tablet is administered orally three times each day.

EXAMPLE 50

Aqueous Injectable

A sterile aqueous preparation for intramuscular injection, containing in each ml. 250 mg. of 1-[p-(2-pyrrolidinoethoxy)phenyl]-2-phenyl-3,4-dihydronaphthalene hydrochloride, is prepared from the following ingredients:

| | Grams |
|---|---|
| 1-[p-(2-pyrrolidinoethoxy)phenyl]-2-phenyl-3,4-dihydronaphthalene hydrochloride | 250 |
| Sodium chloride | 9 |
| Polysorbate 80, U.S.P. | 4 |
| Benzyl alcohol | 9 |
| Water for injection, q.s. to 1000 ml. | |

Five to ten ml. is injected intramuscularly into a medium size dog to overcome dangerously deep anesthesia.

I claim:

1. A compound selected from the class consisting of
   (a) compounds having the formula:

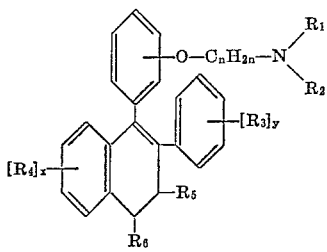

wherein $R_1$ and $R_2$ are selected from the class consisting of lower-alkyl from 1 to 8 carbon atoms, inclusive, and lower-alkyl linked together to form, with the attached N atom, a heterocyclic radical selected from the class consisting of pyrrolidino, 2-methylpyrrolidino, 2,2-dimethylpyrrolidino, piperazino, 4-methylpiperazino, 2,4-dimethylpiperazino, morpholino, piperidino, 2-methylpiperidino, 3-methylpiperidino, hexamethyleneimino, homopiperazino, and homomorpholino, $R_3$ and $R_4$ are selected from the class consisting of trifluoromethyl, lower-alkyl from 1 to 8 carbon atoms, inclusive, lower mono-olefinic alkenyl from 2 to 8 carbon atoms, inclusive, hydroxy, lower alkenyloxy, phenoxy, tolyloxy, xylyloxy, naphthyloxy, biphenylyloxy, halogen, lower-alkylmercapto from 1 to 8 carbon atoms, inclusive, phenylmercapto, tolylmercapto, xylylmercapto, naphthylmercapto, and biphenylylmercapto, $C_nH_{2n}$ represents alkylene from 2 to 6 carbon atoms, inclusive, $x$ and $y$ are integers from 0 to 4, inclusive, and $R_5$ and $R_6$ are selected from the class consisting of hydrogen and lower-alkyl from 1 to 8 carbon atoms, inclusive, (b) the non-toxic pharmacologically acceptable acid addition salts of compounds of the above formula,
   (c) the N-oxides of compounds of the above formula,
   (d) the non-toxic pharmacologically acceptable acid addition salts of N-oxides of compounds of the above formula, and
   (e) the quaternary ammonium salts obtained by reacting the free bases of the above formula with a member selected from the group consisting of lower-alkyl halides, lower-alkenyl halides, di(lower-alkyl) sulfates, aralkyl halides, benzhydryl halides and lower-alkyl arylsulfonates.

2. A compound according to claim 1 wherein $x$ and $y$ are both zero, and $R_5$ and $R_6$ are both hydrogen.

3. A compound according to claim 1 wherein $x$ and $y$ are both zero, $n$ is 2, $R_1$ and $R_2$ are both ethyl, and $R_5$ and $R_6$ are both hydrogen.

4. The hydrochloride of a compound according to claim 3.

5. A compound according to claim 1 wherein $x$ and $y$ are both zero, $n$ is 2, $R_1$ and $R_2$ together with the attached nitrogen represents pyrrolidino, and $R_5$ and $R_6$ are both hydrogen.

6. The hydrochloride of a compound according to claim 5.

7. A compound according to claim 1 wherein $x$ is one, $y$ is zero, $n$ is 2, $R_4$ is hydroxy at the 6-position, $R_5$ and $R_6$ are both hydrogen, and $R_1$ and $R_2$ together with the attached nitrogen represents pyrrolidino.

8. The hydrochloride of a compound according to claim 7.

9. A compound according to claim 1 wherein $x$ is one, $y$ is zero, $n$ is 2, $R_4$ is hydroxy at the 6-position, $R_5$ and $R_6$ are both hydrogen, and $R_1$ and $R_2$ together with the attached nitrogen represents piperidino.

10. The hydrochloride of a compound according to claim 9.

11. 1-[p-(2-diethylaminoethoxy)phenyl]-1-hydroxy-2-phenyl-1,2,3,4-tetrahydronaphthalene.

12. The hydrochloride of a compound according to claim 11.

13. 1-[p-(2-pyrrolidinoethoxy)phenyl]-1-hydroxy-2-phenyl-1,2,3,4-tetrahydronaphthalene.

14. The hydrochloride of a compound according to claim 13.

References Cited

UNITED STATES PATENTS

| 3,164,607 | 1/1965 | Lednicer | 260—294.7 |
| 3,234,211 | 2/1966 | Huebner | 260—294.7 |
| 3,293,263 | 12/1966 | Lednicer | 260—326.5 |
| 3,274,213 | 8/1966 | Lednicer | 260—294.7 |

HENRY R. JILES, *Primary Examiner.*

A. D. SPEVACK, *Assistant Examiner.*